Nov. 4, 1952         F. G. ROMBERGER         2,616,202
FISHING ROD
Filed Aug. 23, 1948                                      2 SHEETS—SHEET 2
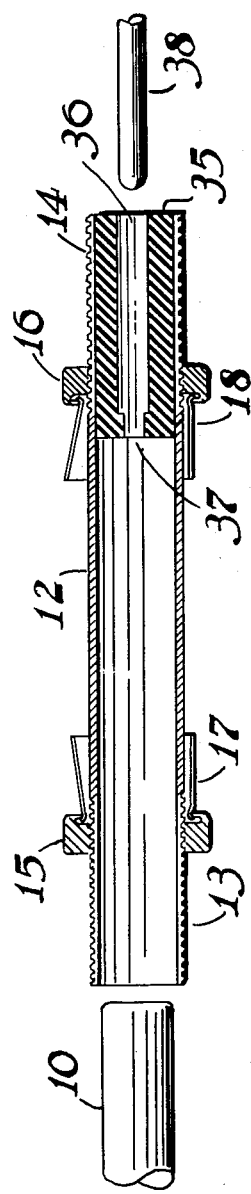
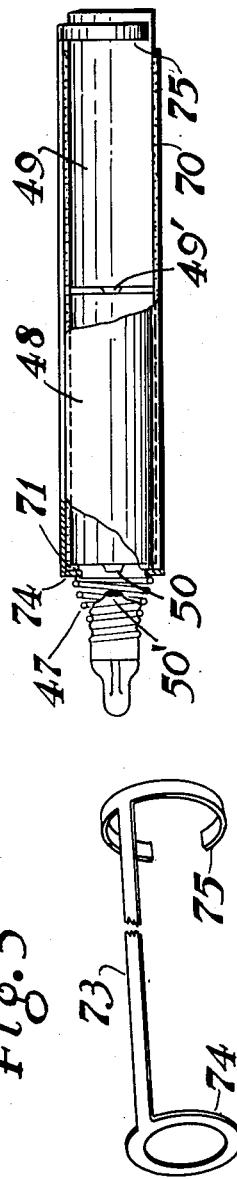
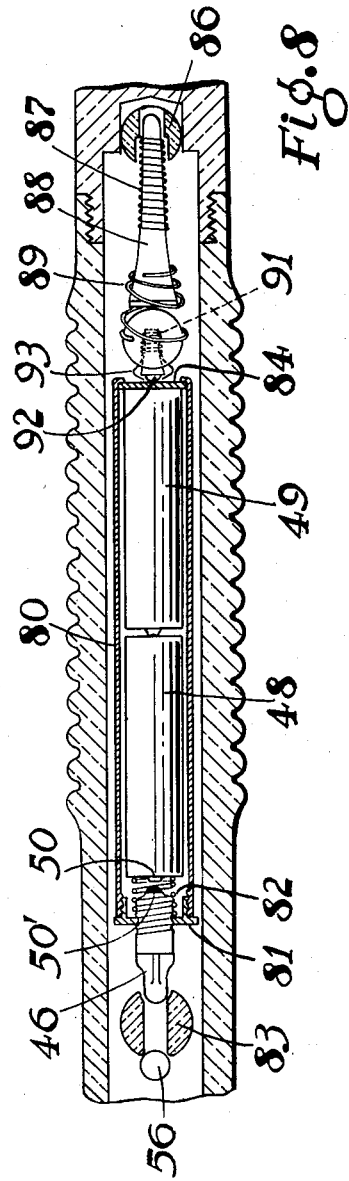
Inventor
Frank G. Romberger
By William A. Zalesak
Attorney Patented Nov. 4, 1952

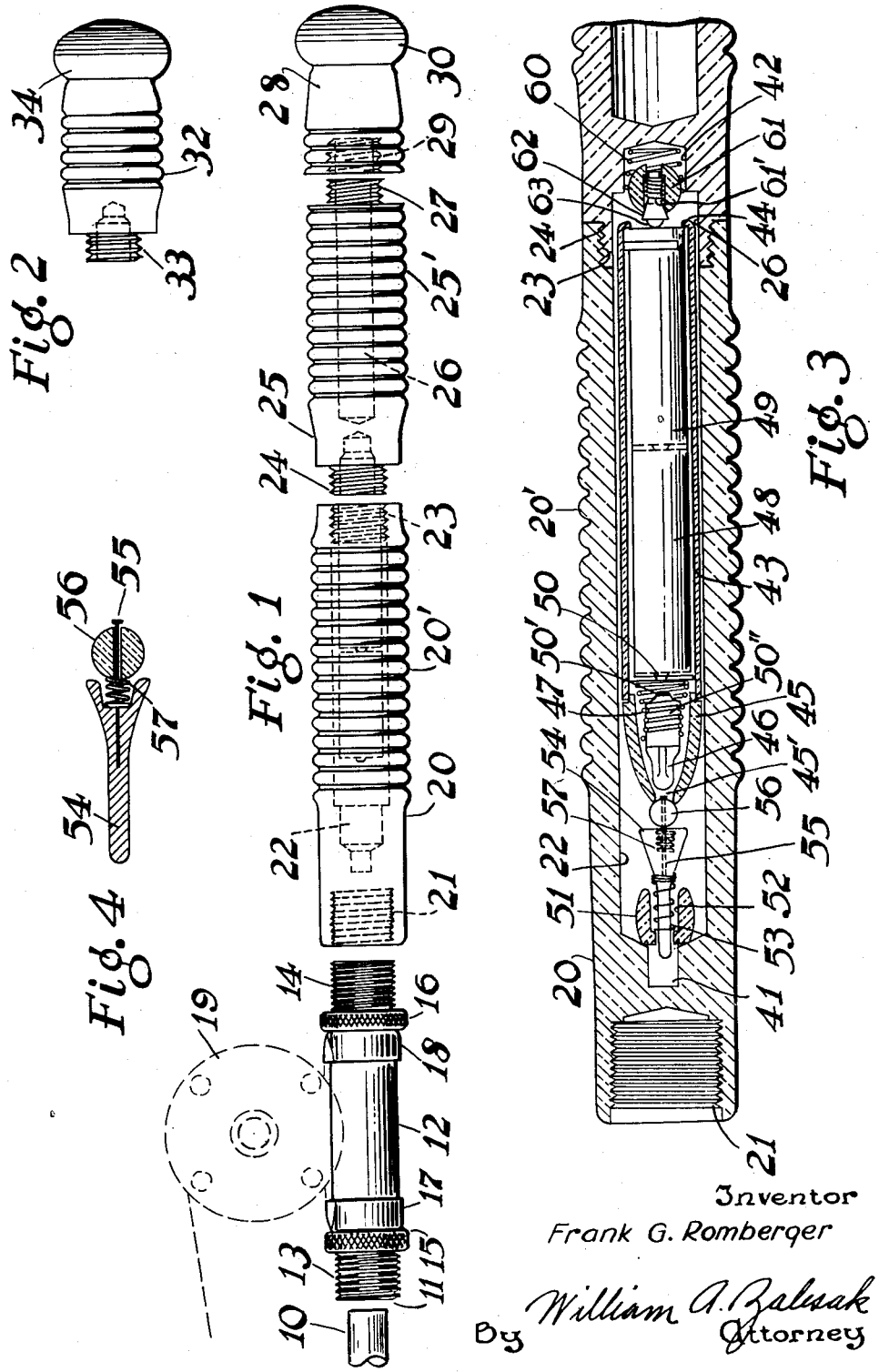

2,616,202

UNITED STATES PATENT OFFICE 2,616,202

FISHING ROD

Frank G. Romberger, Elizabeth, N. J.

Application August 23, 1948, Serial No. 45,611

10 Claims. (Cl. 43—17)

1

My invention relates to fishing rods, more particularly to fishing rods suitable for fresh water or salt water fishing, either still fishing or casting and for day and night operation.

Efforts have been made in the past to provide fishing rods suitable for use for night fishing and employing a light which is caused to flash when a quarry bites or is hooked on the line. Most of these devices relay on awkward and complicated switching mechanism having extended arms or levers for operating a switch for controlling battery and light bulb, the battery and light bulb being supported in position on the rod in a separate container attached to the rod. These devices are normally insensitive and are incapable of differentiating between a bite and a steady pull. When fishing in the dark, it is of course very difficult, if not impossible, for a fisherman to watch his pole. He must depend entirely upon feel. As pointed out efforts have been made to supply a fishing pole with attachments for indicating or signalling as by a light when the fisherman has a bite or nibble. Many of the now known devices for this purpose are so complicated as to discourage their use. In many instances their addition or incorporation in fishing equipment results in such bulky and insensitive structures as to lead the fisherman to disregard these devices.

Another object of my invention is to provide a novel and improved indicating means for a fishing rod wherein the presence of fish on the line is indicated by flashing of a lamp, or where a catch is indicated by a steady glow of the lamp.

A further object of my invention is to provide such an indicating device having no external movable parts for actuating the light bulb and which indicates by flashing or by a steady light a nibble or a positive catch.

A still further object of my invention is to provide such a device which is very sensitive and in which the light bulb and battery can be easily replaced.

A further object of my invention is to provide a device of the character described in which the handle is provided with chambers for receiving extra parts such as batteries and light bulbs.

These and other objects will be described herein.

The novel features which I believe to be characteristic of my invention are set forth with particularity in the appended claims, but the invention itself will best be understood by reference to the following description taken in connection with the accompanying drawing in which

2

Figure 1 is a view with parts disconnected and positioned in proper sequence so that when screwed together they provide a fishing pole suitable for surf casting, Figure 2 shows a portion which replaces other parts of the handle when it is desired to shorten the pole for still or fresh water fishing; Figure 3 is a longitudinal section of a portion of the pole in combination with the novel indicating means made according to my invention; Figure 4 shows details of a portion of Figure 3; Figure 5 shows details of a reversible coupling for modifying the pole from a surf casting pole to a still water fishing pole and vice versa; Figure 6 shows details of the battery, support and connection utilized in the combination shown in Figure 3; Figure 7 shows details of the battery connection used in connection with the batteries, and Figure 8 shows a modification of Figure 3.

Referring to Figure 1, a fishing pole made according to my invention includes the usual pole portion 10, a part only of which is shown. This is slidably received with a machine fit into the end 11 of the reversible coupling member 12 having threaded ends 13 and 14, either of which can be received within the threaded portion 21 of member 22 of the pole. Supported on the threaded portions 13 and 14 are rotatable knurl collars 15 and 16 carrying collar members 17 and 18 for receiving and locking the fishing reel 19 in place. The details of this reversible coupling member will be described below.

The portion 20 is provided with a hollow chamber 22 for receiving the light-bulb operating mechanism shown in dotted lines and has the beaded portion 20' for facilitating gripping of the handle. One end is provided with the inner threaded portion 23 for receiving outer threaded end portion 24 of the handle element 25 having beads 25' for gripping and is also provided with the hollow chamber 26 which may be used to carry an extra light bulb and batteries. The threaded end portion 27 is received within the threaded portion 29 of the end element 28 of the pole which may be provided with a cushion 30 of soft material. It will be thus seen that all of these portions or elements can be screwed together to provide a unitary structure for purposes to be described.

In accordance with my invention I provide an extremely sensitive and accurately adjustable indicating mechanism within the chamber 22 of the handle. As shown in Figure 3 the chamber 22 is provided at one end with the restricted recess 41. The portion 25 is also provided with a chamber 26 which when the portions 20 and 25 are engaged provide an enclosed chamber having a restricted well recess 42.

Within the chamber is mounted the battery and light bulb assembly comprising the batteries 48 and 49 received within the insulating tubular member 43 having a lip 44. This tubular member has at one end the cap 45 having the opening 45' adjacent which is seated the flashlight bulb 46. Connected between the flashlight bulb 46 and the end of the battery is the spring 47 which normally keeps the battery terminal 50 from contacting the terminal 50' of the bulb so that an open circuit is provided. This assembly is spring supported for slidable contact within the chamber at both ends. As shown at the left hand end, a ball 51 is provided with a passageway 52 extending therethrough for receiving the spring 53 which spring supports conical element 54 within the passageway or bore, the end extending into recess 41. At the larger end of the conical member is mounted ball element 56 spring supported on the stud 55 and spring pressed outwardly by means of the spring 57 into engagement in the aperture 45' in the cap member 45. Mounted to the other end of the battery assembly is the spring 60 within the well 42 which spring supports ball-like member 61 having a recess extending therethrough in which the conical-shaped member 62 is supported by means of the spring 61', the end supporting the ball 63. It will thus be seen that the light bulb is spring biased away from the battery and that the battery and light bulb with the insulating supporting casing 43 are spring supported within the chamber by spring assemblies at either end.

Under conditions to be described, contact is made between the terminal 50' of the light bulb and terminal 50 to place the bulb across the two batteries in series. The electrical circuit will be described in connection with Figures 6 and 7.

Batteries 48 and 49 are supported within the insulating sleeve 70, provided with lip 71 for covering the outer edge of the battery casing of the battery 48. It is understood that this assembly is mounted within the insulating tube 43. Mounted on the outside of the insulating casing is a connecting conductor comprising an elongated conductor 73 having at one end ring 74 positioned against collar 71 but insulated from the battery. The other end of the conductor or connector is provided with spring clip 75 so that a circuit is completed from terminal 50 of battery 48 through the terminal 49' of battery 49, clip 75, conductor 73, back to the ring 74. Thus when the batteries are pressed against the terminal 50' of the light bulb a circuit is completed from this contact through the batteries, conductor 73, ring 74, spring member 47 and screw portion 50'' of the light bulb.

While the applicant does not wish to be held to the theory described below, to the best of his knowledge and belief the operation described explains what happens in connection with his device. If the pole is held vertically with the bumper 30 down and the bottom of the batteries at the lower end, the entire weight of the batteries, light bulb and case is supported by means of the element 62, placing springs 60 and 61 under compression. Under these conditions the space between the terminals 50' and 50 is at a maximum. As the pole is tilted from a vertical to a horizontal position more and more of the weight of the batteries is carried by the walls of the chamber and less by springs 60 and 61, permitting energy stored in these springs to compress still further and further the springs 52, 57 and 47. For predetermined conditions of adjustment, a certain angle will be reached where the forces are so balanced that contact is made between terminals 50 and 50', thus completing a circuit between the light bulb and battery terminals. It is possible to accurately and minutely adjust the balance between the various springs by screwing the two portions 20 and 25 of the handle toward and away from each other to determine the angle at which contact will be made between terminals 50 and 50'. The device is so sensitive that a very small change in the angle will light or extinguish the bulb 46 so that slight tugs will cause a flicker of the bulb, indicating a nibble. On the other hand a steady pull will disturb the angle of the pole to such an extent that the light will stay on, indicating a catch.

With the arrangements described it is possible to utilize the light bulb in the handle, which is preferably made of clear plastic or other clear material, at night for baiting or other purposes for which a light may be desired, thus eliminating the need for an extra flashlight.

Chamber 46' may be used to store extra batteries and extra light bulbs for replacement purposes.

The modification shown in Figure 8 includes the tubular metallic casing 80 having a closure member 81 screw threaded to fit the end of the casing. This screw threaded portion 81 receives the light bulb 46 having one contact 50'. Two batteries 48 and 49 provided with insulated paper covers are slidably mounted within the casing and maintained out of contact with the light bulb 46 by means of spring 82 so that no contacts occur between contacts 50, 50' when the pole is in a vertical position. A clear plastic bead 83 receives the end of the light bulb 46. The other end of the casing is provided with a slidable metallic disc 84 contacting the walls of the metallic tubular member or casing 80 at the bottom of the battery 49 so that when the spring 82 is compressed to permit contact between contacts 50 and 50' a circuit is completed from the light bulb through contacts 50, 50', batteries 48 and 49, disc 84, casing 80, closure member 81 to bulb 46.

In this arrangement the spring support comprises the member 88, spring mounted by means of spring 87 and the ball-like support 86 received within a depression in the chamber of the handle. Supported at the other end of the member 88 is a spherical member supporting therein a second conically shaped member resiliently by means of spring 91. This assembly is maintained on member 88 by spring 89. The ball-like member 92 in contact with disc 84 may be retained by means of the spring like arms 93. The device functions in the same manner described above for the first modification.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A fishing pole having a handle provided with an elongated chamber, a battery and light bulb assembly supported within said chamber and including a tubular casing, a light bulb at one end of said tubular casing, said tubular casing receiving therewithin a battery, resilient means positioned between said light bulb and said battery and normally biased to maintain an open circuit between said light bulb and said battery, a resilient support for said assembly, said resilient means and said resilient support being adjusted whereby when said pole is tilted from the vertical to exceed a certain degree, energy stored in said resilient support is delivered to said battery and light bulb assembly to compress said resilient means supported between said battery and light bulb to make contact between said light bulb and battery to cause said light bulb to be illuminated.

2. A fishing pole having a handle provided with an elongated chamber, a battery and light bulb assembly slidably supported within said chamber and including a tubular casing, a light bulb at one end of said tubular casing, a battery slidably mounted within said casing, a spring positioned between said light bulb and said battery and normally biased to maintain an open circuit between said light bulb and said battery, a resilient support at one end of said assembly, the resilient support contacting the end of said battery whereby when said pole is tilted to exceed a certain degree from the vertical energy stored in said resilient support is delivered to said battery and light bulb to compress said spring supported between said battery and light bulb to make contact between said light bulb and battery to cause said light bulb to be illuminated.

3. A fishing pole having a handle provided with an elongated chamber, the ends of which are provided with restricted recesses, a battery and light bulb assembly slidably supported within said chamber and including a tubular casing, a light bulb in one end of said tubular casing, said casing having therewithin a battery, a spring positioned between said light bulb and said battery and normally biased to maintain an open circuit between said light bulb and said battery, a spring support at one end of said assembly and including a spring pressed element and means for supporting said spring pressed element within said recess, the spring pressed element contacting the end of said assembly and a second spring support mounted in the other recess of said chamber and having an element contacting the battery, and means for adjusting the stresses within spring and spring elements whereby when said pole is tilted to exceed a certain degree from the vertical energy stored in one of said spring supports is delivered to said battery and light bulb to compress said spring between said battery and light bulb to make contact between said light bulb and battery to cause said light bulb to be illuminated.

4. A fishing pole having a handle provided with an elongated chamber, the ends of which are provided with restricted recesses, a battery and light bulb assembly slidably supported within said chamber and including a tubular casing, a light bulb in one end of said tubular casing, said casing having therewithin a battery, a spring positioned between said light bulb and said battery and normally biased to maintain an open circuit between said light bulb and said battery, a spring support at one end of said assembly and including a spring pressed element and means for supporting said spring pressed element within said recess, the spring pressed element contacting the end of said assembly and a second spring support mounted in the other recess of said chamber and having an element contacting the battery, and means for adjusting the stresses within the spring and spring elements whereby when said pole is tilted to exceed a certain degree from the vertical energy stored in one of said spring supports is delivered to said battery and light bulb to compress said spring between said battery and light bulb to make contact between said light bulb and battery to cause said light bulb to be illuminated, means for adjusting stresses in said spring and spring elements including a two-part handle having means for permitting relative adjustment between said parts for increasing or decreasing the length of said chamber.

5. A fishing pole having a tubular element provided with a chamber, an assembly comprising a tubular member open at one end mounted within said chamber, a light bulb at the end of said tubular member, a battery within said tubular member and resilient means between said light bulb and said battery maintaining said battery and said light bulb out of contact with each other, and a resilient means between the open end of said tubular member and an end wall of said chamber and contacting the end of said battery, said last resilient means supporting substantially all of the weight of said assembly when said pole is in a vertical position.

6. A fishing pole having a portion supporting a battery and light bulb assembly, said assembly including a casing in which said light bulb and battery are mounted, resilient means between said battery and light bulb biasing said battery and light bulb out of contact with each other, resilient means on said pole and contacting said assembly and resiliently supporting said assembly with respect to said pole and adapted to transfer stresses from said resilient means to said battery and light bulb assembly when said pole is tilted to a predetermined angle from a vertical position for causing contact between said battery and said light bulb by neutralizing said biasing means.

7. A fishing pole having a portion provided with a hollow chamber, a battery and a light bulb assembly, said assembly including a casing supporting a battery and light bulb and slidably supported within said chamber, resilient means between said battery and said light bulb biasing said light bulb away from said battery to maintain an open circuit therebetween, resilient means in contact with said battery and light bulb assembly and said pole, said resilient means redistributing stresses stored within said resilient means when said pole is tilted to a predetermined angle from a vertical position for transferring stresses from said resilient means to said biasing means for neutralizing the effect of said biasing means and causing contact between said battery and said light bulb.

8. A fishing pole having a portion provided with a hollow chamber, a battery and light bulb assembly having a casing supporting a battery and a light bulb and slidably supported within said chamber, resilient means between said light bulb and said battery biasing said light bulb away from said battery to maintain an open circuit therebetween, spring means mounted on both ends of said chamber and in contact with the ends of said battery and light bulb assembly said spring means redistributing stresses stored within said spring means when said pole is tilted from a vertical position to a predetermined angle to the vertical for transferring stresses from said spring means to said biasing means for neutralizing the effect of said biasing means and causing contact between said battery and said bulb.

9. A fishing pole having a handle provided with an elongated chamber, a battery and light bulb assembly having a casing supporting a battery and a light bulb and slidably mounted within said chamber, spring means positioned between said light bulb and battery for maintaining said light bulb out of contact with said battery, a spring element at one end of said chamber and contacting one end of said light bulb and battery assembly, and a second spring element at the other end of said chamber and contacting the other end of said light bulb and battery assembly, said spring elements and spring means being adjusted so that a balance is established therebetween for permitting the spring means to maintain said light bulb and battery out of contact with each other but causing said spring means to be placed under compression whereby said light bulb and battery are brought into contact with each other to cause illumination of said light bulb when said pole reaches a certain degree of tilt from the vertical.

10. A fishing pole having a handle provided with an elongated chamber, a battery and light bulb assembly having a casing supporting a battery and a light bulb and slidably mounted within said chamber, spring means positioned between the light bulb and battery of said assembly for maintaining said light bulb out of contact with said battery, a spring at one end of said chamber and contacting one end of said light bulb and battery assembly, and a second spring at the other end of said chamber and contacting the other end of said light bulb and battery assembly, said springs and spring means being adjusted so that a balance is established therebetween for permitting the spring means to maintain said light bulb and battery out of contact with each other when the pole is in a vertical position but causing said spring means to be placed under compression whereby said light bulb and battery are brought into contact with each other to cause illumination of said light bulb when said pole reaches a certain degree of tilt.

FRANK G. ROMBERGER.

REFERENCES CITED

The following references are of record in the file of this patent:

UNITED STATES PATENTS

| Number | Name | Date |
|---|---|---|
| 583,016 | Bacon | May 25, 1897 |
| 828,557 | Levison | Aug. 14, 1906 |
| 1,964,949 | Janzen | July 3, 1934 |
| 2,002,135 | Barton | May 21, 1935 |
| 2,008,201 | Goertzen | July 27, 1937 |
| 2,122,215 | Saelen | June 28, 1938 |
| 2,150,644 | Batcheller | May 14, 1939 |
| 2,252,358 | Tosi | Aug. 12, 1941 |
| 2,349,077 | Comparelli | May 16, 1944 |
| 2,409,988 | Schwebs | Oct. 22, 1946 |